US011416801B2

(12) United States Patent
Biswas et al.

(10) Patent No.: US 11,416,801 B2
(45) Date of Patent: Aug. 16, 2022

(54) ANALYZING VALUE-RELATED DATA TO IDENTIFY AN ERROR IN THE VALUE-RELATED DATA AND/OR A SOURCE OF THE ERROR

(71) Applicant: Accenture Global Solutions Limited, Dublin (IE)

(72) Inventors: Sayantani Biswas, Bangalore (IN); Nithyanandan Periasamy Dhanapal, Bangalore (IN); Satish Vemuri, Bangalore (IN); Ankan Bera, Bengaluru (IN); Veenashri Zulpi, Bengaluru (IN); Surya Kumar I.V.G, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 814 days.

(21) Appl. No.: 15/818,471

(22) Filed: Nov. 20, 2017

(65) Prior Publication Data

US 2019/0156264 A1 May 23, 2019

(51) Int. Cl.
*G06Q 10/06* (2012.01)
*G06Q 30/04* (2012.01)

(52) U.S. Cl.
CPC ....... *G06Q 10/06395* (2013.01); *G06Q 30/04* (2013.01)

(58) Field of Classification Search
CPC .................................................. G06Q 10/06395
See application file for complete search history.

(56) References Cited

U.S. PATENT DOCUMENTS

| | | | |
|---|---|---|---|
| 9,082,076 B2 | 7/2015 | Miranda et al. | |
| 2004/0083199 A1 | 4/2004 | Govindugari et al. | |
| 2006/0238919 A1* | 10/2006 | Bradley | G06F 16/215 360/128 |
| 2013/0086010 A1* | 4/2013 | Wenzel | G06F 11/076 707/E17.005 |
| 2014/0051387 A1* | 2/2014 | Mollersten | H04L 12/1485 455/406 |
| 2014/0122081 A1* | 5/2014 | Kaszczuk | G10L 13/08 704/260 |
| 2015/0363437 A1 | 12/2015 | Florez et al. | |

FOREIGN PATENT DOCUMENTS

| | | | | |
|---|---|---|---|---|
| CA | 2772389 A1 * | 3/2011 | ....... | G06F 17/30241 |
| WO | 2011022499 A1 | 2/2011 | | |

OTHER PUBLICATIONS

Jan Van den Broeck et al., "Data Cleaning: Detecting, Diagnosing, and Editing Data Abnormalities," Oct. 2005, PLoS Medicine, vol. 2, Issue 10, pp. 966-970 (Year: 2005).*

* cited by examiner

*Primary Examiner* — Amanda Gurski
(74) *Attorney, Agent, or Firm* — Harrity & Harrity, LLP

(57) ABSTRACT

A device may receive data related to operations of an organization. The operations of the organization may be associated with a value. The data may be received from two or more systems associated with the organization. The device may process the data using a set of rules to permit an analysis of the data. The device may process the data to identify an error related to the data or a source of the error. The error may negatively impact the value associated with the operations of the organization. The device may perform an action after identifying the error or the source of the error. The action may facilitate fixing the error.

20 Claims, 7 Drawing Sheets

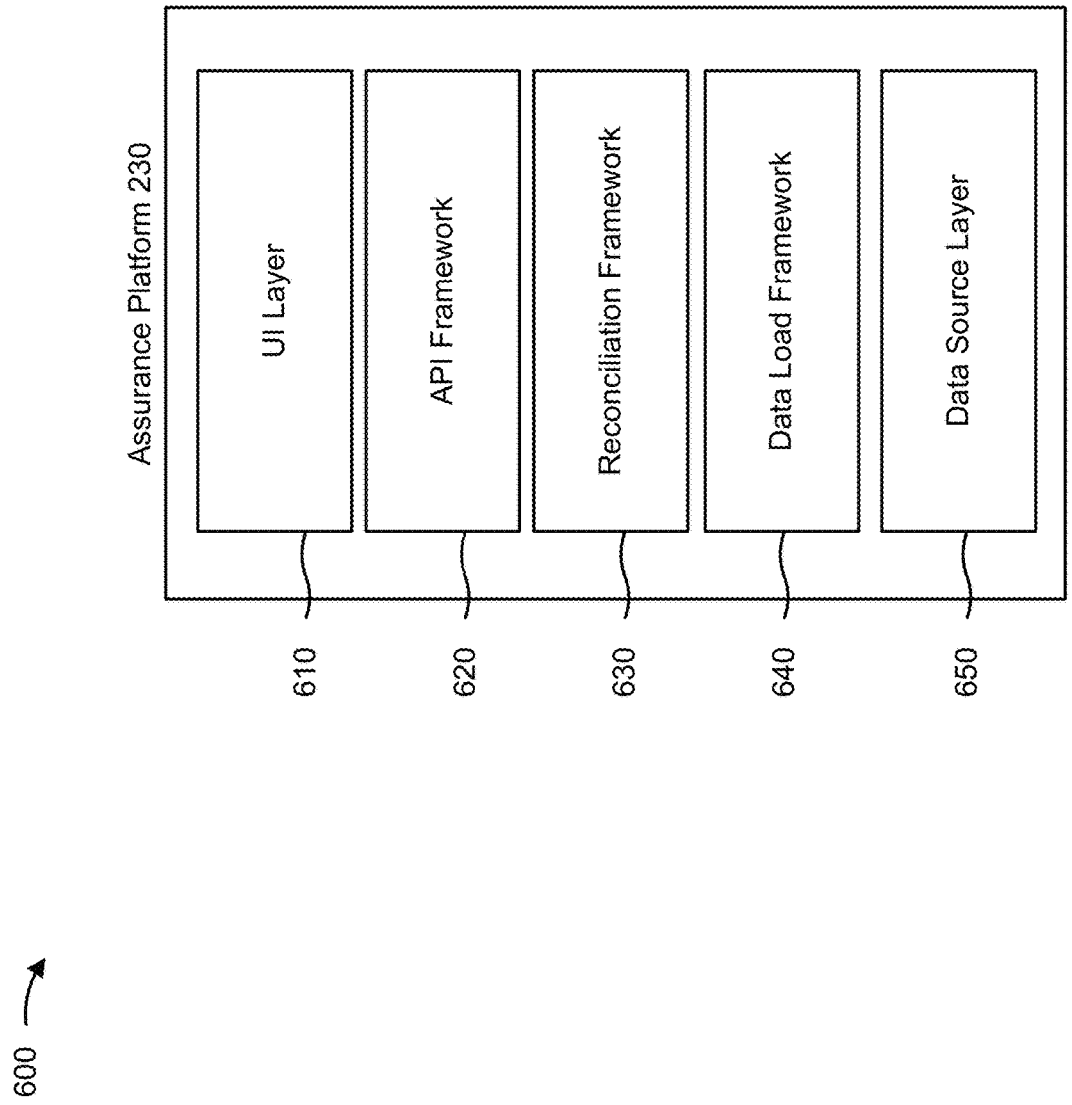

ANALYZING VALUE-RELATED DATA TO IDENTIFY AN ERROR IN THE VALUE-RELATED DATA AND/OR A SOURCE OF THE ERROR

BACKGROUND

Data cleansing is the process of detecting and correcting (and/or removing) corrupt or inaccurate data. For example, data cleansing may include identifying incomplete, incorrect, inaccurate, or irrelevant portions of data (e.g., records from a record set, table, or database) and then replacing, modifying, or deleting the identified portions. Data cleansing may include applying data quality criteria, such as validity (e.g., the degree to which the data conforms to defined rules or constraints), accuracy (e.g., the degree of conformity of the data to a standard or a true value), completeness (e.g., the degree to which all needed data is known), consistency (e.g., the degree to which a set of data is equivalent across systems), and uniformity (e.g., the degree to which a set of data is specified using the same units of measure in various systems).

SUMMARY

According to some possible implementations, a device may include one or more processors to receive, from multiple systems, data. The data may be related to at least one of a customer, a service provided to the customer, or an item to be provided to the customer. The multiple systems may be related to operations of an organization. At least two of the multiple systems may be capable of communicating with each other. The one or more processors may process the data using a set of rules to permit an analysis of the data. The one or more processors may process the data to identify an error related to the data or a source of the error. The error may cause a value related to the operations to be reduced. The one or more processors may perform an action after identifying the error or the source of the error. The action may positively impact: the error, the operations of the organization, or the value related to the operations.

According to some possible implementations, a method may include receiving, by a device, data related to operations of an organization. The operations of the organization may be associated with a value. The data may be received from two or more systems associated with the organization. The method may include processing, by the device, the data using a set of rules to permit an analysis of the data. The method may include processing, by the device, the data to identify an error related to the data or a source of the error. The error may negatively impact the value associated with the operations of the organization. The method may include performing, by the device, an action after identifying the error or the source of the error. T action may facilitate fixing the error.

According to some possible implementations, a non-transitory computer-readable medium may store one or more instructions that, when executed by one or more processors, cause the one or more processors to receive, from multiple systems, data related to a customer, a service provided to the customer, or an item to be provided to the customer. The data may be used to identify an accuracy of a value associated with the data. The one or more instructions, when executed by the one or more processors may cause the one or more processors to process the data using a set of rules to permit an analysis of the data after receiving the data from the multiple systems. The one or more instructions, when executed by the one or more processors may cause the one or more processors to process the data to identify an error related to the data or a source of the data. The one or more instructions, when executed by the one or more processors may cause the one or more processors to perform an action after identifying the error or the source of the error. The action may positively impact the error, or the accuracy of the value associated with the data.

BRIEF DESCRIPTION OF THE DRAWINGS

FIG. 6 is a diagram of an example implementation relating to the example process shown in FIG. 4.

DETAILED DESCRIPTION

The following detailed description of example implementations refers to the accompanying drawings. The same reference numbers in different drawings may identify the same or similar elements.

An organization, such as a telecommunication organization, may bill a customer for a service and/or an item provided to the customer. Determining an amount to bill a customer, a value of services and/or items provided to a customer, and/or the like may depend on input from multiple systems associated with the organization. In some cases, data from different systems may need to be normalized, aggregated, and/or the like to permit an analysis of the data. In addition, mismatches in the data may result in the organization losing value (e.g., due to billing the customer for fewer services and/or items than the customer received). Further, mismatches in data may consume processing resources of a system by causing the system to generate an error report, by processing data incorrectly, by processing the same data multiple times (e.g., after an error report is generated and/or an error is fixed), and/or the like.

Some implementations, described herein, provide an assurance platform that is capable of receiving data from multiple systems associated with an organization and identifying a set of errors in the data that may have resulted in, for example, lost value for the organization, consumption of processing resources by a system associated with the organization, and/or the like. In this way, the assurance platform may permit identification and/or collection of a lost value, may minimize interruptions to operations of the organization, and/or the like. This improves operations of the organization via recapture of a lost value and/or by reducing or eliminating interruptions to the operations that would otherwise have resulted from error-containing data. In addition, this conserves processing resources of a system associated with the organization via a reduction in errors associated with operations of the system, and/or via a reduction in manual intervention to correct error-containing data. Further, the assurance platform may process data from separate systems that are not normally capable of communicating with each other or that use data in different manners. This permits the assurance platform to identify errors in data that would not otherwise be identified via error detection techniques implemented by the systems.

Figure 1A:
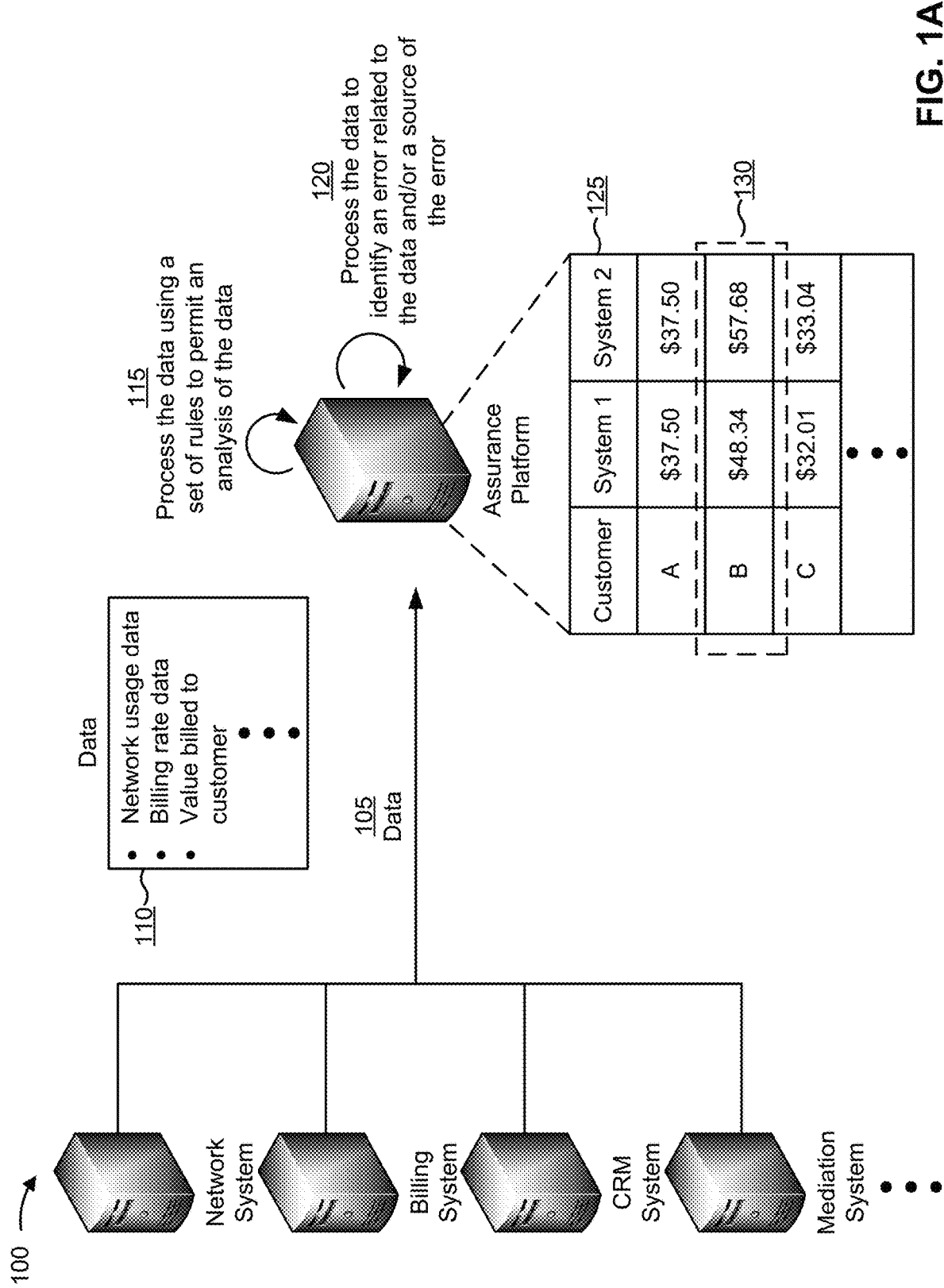
FIGS. 1A and 1B are diagrams of an overview of an example implementation described herein.
Figure 1B:
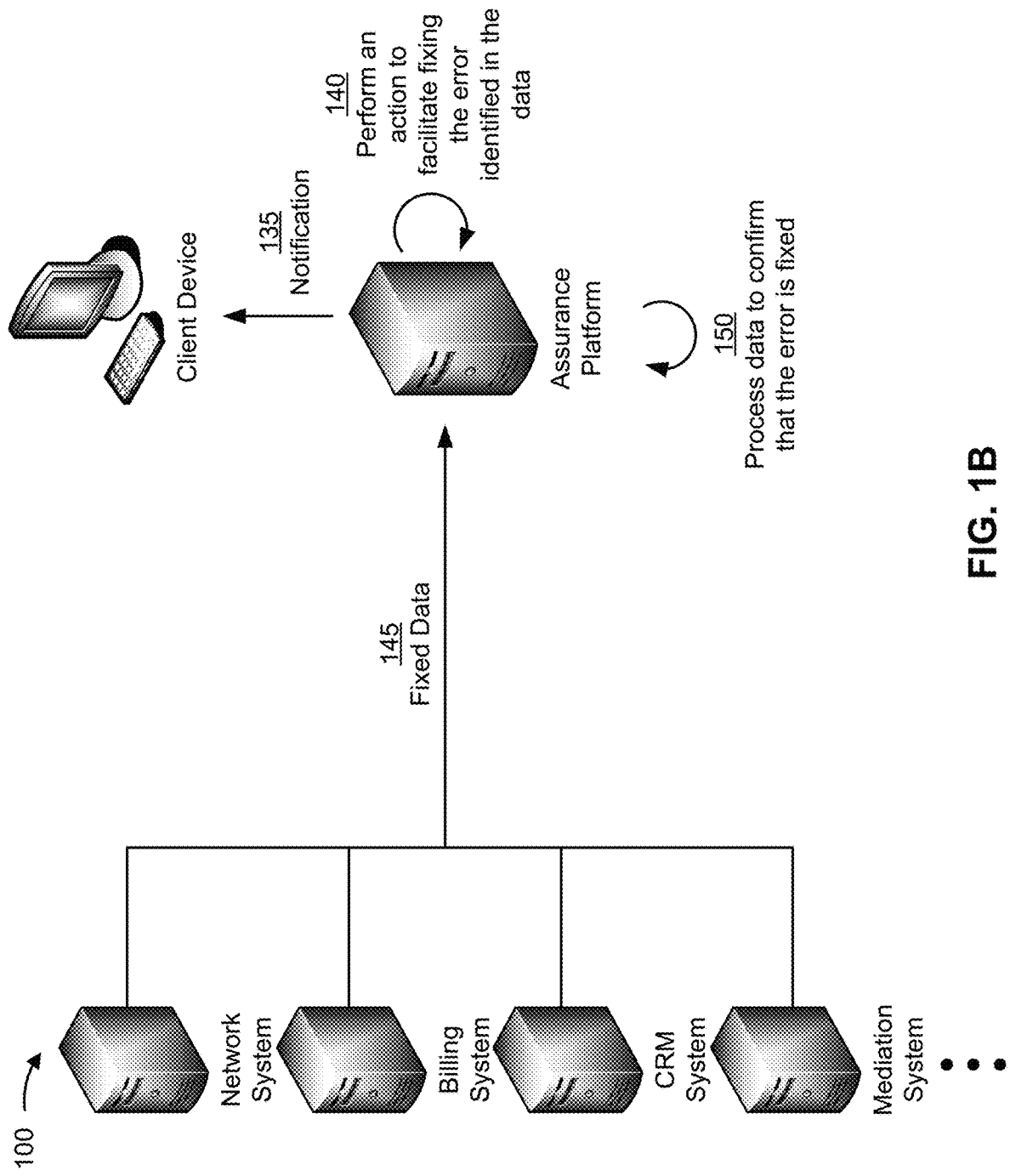

FIGS. 1A and 1B are diagrams of an overview of an example implementation 100 described herein. As shown in FIGS. 1A and 1B, example implementation 100 includes various systems (e.g., a network system, a billing system, a customer relationship management (CRM) system, a mediation system, etc.), an assurance platform, and a client device (not shown in FIG. 1A). In some implementations, the various systems may be associated with an organization, such as a service provider organization (e.g., a telecommunications provider, an internet service provider (ISP), television service provider, etc.). In some implementations, two or more of the various systems may be capable of communicating with each other.

As shown in FIG. 1A, and by reference number 105, the assurance platform may receive data from the various systems. For example, the assurance platform may receive the data periodically, based on requesting the data, according to a schedule, and/or the like. The assurance platform may receive thousands, millions, billions, etc. of data elements, thereby receiving a data set that cannot be processed manually or objectively by a human actor. Although FIG. 1A shows particular systems from which the assurance platform receives data, these systems are shown merely as examples. The assurance platform may receive data from other types of systems, such as an inventory management system, an order management system, a retail order management system, an online billing system, a retail billing system, a point-of-sale system, and/or the like. In addition, the dots shown in FIG. 1A indicate that additional systems, other than the systems shown, could be present.

As shown by reference number 110, the data may include network data usage data (e.g., data that identifies usage of network resources, such as airtime, bandwidth, etc. by a customer), billing rate data (e.g., data that identifies a rate at which a customer is billed for usage of network resources), a value billed to a customer (e.g., for usage of network resources, services, etc.), and/or the like.

As shown by reference number 115, the assurance platform may process the data using a set of rules to permit an analysis of the data. For example, the set of rules may relate to a format of the data, a file type of the data, deduplication of data elements of the data, aggregating data elements of the data, whether the correct data elements or records are included in the data, and/or the like. The assurance platform may receive the set of rules based on input from a user of the client device, by processing a document (e.g., using a text processing technique), by processing the data using machine learning and/or artificial intelligence, such as to identify a pattern in the data, and/or the like. When processing the data, the assurance platform may process thousands, millions, billions, etc. of data elements, thereby processing a data set that cannot be processed manually or objectively by a human actor.

As further shown in FIG. 1A, and by reference number 120, the assurance platform may process the data to identify an error related to the data and/or a source of the error. For example, the assurance platform may determine whether the same data from different systems includes the same data elements. Additionally, or alternatively, the assurance platform may determine whether values for data elements match across different systems. Additionally, or alternatively, the assurance platform may identify a trend or a pattern related to errors in the data (e.g., a trend or pattern related to a particular system having error-containing data, a particular customer being associated with error-containing data, a particular service or item being associated with error-containing data, etc.).

After identifying an error in the data, the assurance platform may identify a source of an error in the data. For example, the assurance platform may compare values for data elements across multiple systems to identify a correct value, thereby permitting the assurance platform to identify a system that caused the error. Additionally, or alternatively, and as another example, the assurance platform may determine whether a data element was manually modified from a correct value to an incorrect value (e.g., using a log of modifications to the data). Additionally, or alternatively, and as another example, the assurance platform may determine whether different systems are performing the same processing of data in the same manner (e.g., by inputting test data into the different systems and analyzing an output of the different systems). In some implementations, the assurance platform may process thousands, millions, billions, etc. of data elements. In this way, the assurance platform may process a data set that cannot be processed manually or objectively by a human actor.

As further shown in FIG. 1A, reference number 125 shows an example of data that the assurance platform may analyze. In this case, the assurance platform may analyze values billed to various customers (e.g., customers A, B, and C) as recorded in different systems (e.g., system 1, system 2, etc.). The assurance platform may analyze values for hundreds, thousands, millions, etc. of customers associated with tens, dozens, hundreds, etc. of departments of an organization and/or tens, dozens, hundreds, etc. of service lines and/or product lines offered by the organization. In this way, the assurance platform may process a data set that cannot be processed manually or objectively by a human actor. Further, the assurance platform may process data from separate systems that are not normally capable of communicating with each other or that use data in different manners. This permits the assurance platform to identify errors in data that would not otherwise be identified via error detection techniques implemented by the systems.

As shown by reference number 130, the assurance platform may identify records for a customer that include an error (e.g., by identifying a value for a customer that differs across multiple systems, or by identifying a value that differs by a threshold amount), and may identify a source of the error. For example, the assurance platform may identify that systems 1 and 2 are storing values for customer B that differ by a threshold amount (e.g., values for a service and/or an item provided to customer B). The assurance platform may identify that system 1 is the source of the error by determining that system 1 used inaccurate data related to usage of a service and/or an item to determine a value for customer B, used an incorrect billing rate to determine a value for services provided to customer B, generated an error during determination of a value for customer B that resulted in system 1 inaccurately determining the value, and/or the like.

As shown in FIG. 1B, and by reference number 135, the assurance platform may provide, for display, a notification to the client device identifying the error in the data and/or the source of the error. As shown by reference number 140, the assurance platform may perform an action to facilitate fixing the error identified in the data. For example, the assurance platform may update data elements included in the data, may generate a work ticket to fix the error or the system that caused the error, may power down a system that caused the error and/or boot up a backup system, may obtain and install software for the system (or provided a set of instructions to cause the system to do so), may obtain backup data and replace data stored by a system with the backup data, and/or the like.

As shown by reference number 145, the assurance platform may request data from the various systems after fixing the data (e.g., may request fixed data). As shown by reference number 150, the assurance platform may process the data to confirm that the error is fixed. For example, the assurance platform may process the data in a manner similar to that described with respect to reference numbers 115 and 120. This conserves processing resources of the systems that would otherwise be consumed from data continuing to contain an error. Further, this permits the systems to correct errors related to collecting a value for a service and/or an item provided to a customer (e.g., by permitting the systems to provide a corrected bill to a customer, by permitting the systems to identify an incorrect bill before the bill is provided to a customer, etc.).

In this way, the assurance platform may process data to identify an error in the data and/or a source of the error. This improves operations of an organization and/or a system that uses the data (e.g., via identification and/or collection of a lost value for a service and/or an item provided to a customer). In addition, this conserves processing resources of a system associated with the organization that would otherwise be consumed based on processing data that includes an error.

As indicated above, FIGS. 1A and 1B are provided merely as an example. Other examples are possible and may differ from what was described with regard to FIGS. 1A and 1B. For example, while some implementations are described with respect to a service provider organization in the form of a telecommunications organization, the implementations apply equally to other types of organizations, such as a financial institution, a retail organization, a manufacturing organization, a utility organization, a healthcare organization, and/or the like. In addition, the implementations apply equally to both enterprise-focused organizations (e.g., organization-to-organization type organizations) and customer-focused organizations (e.g., organization-to-customer type organizations).

Figure 2:
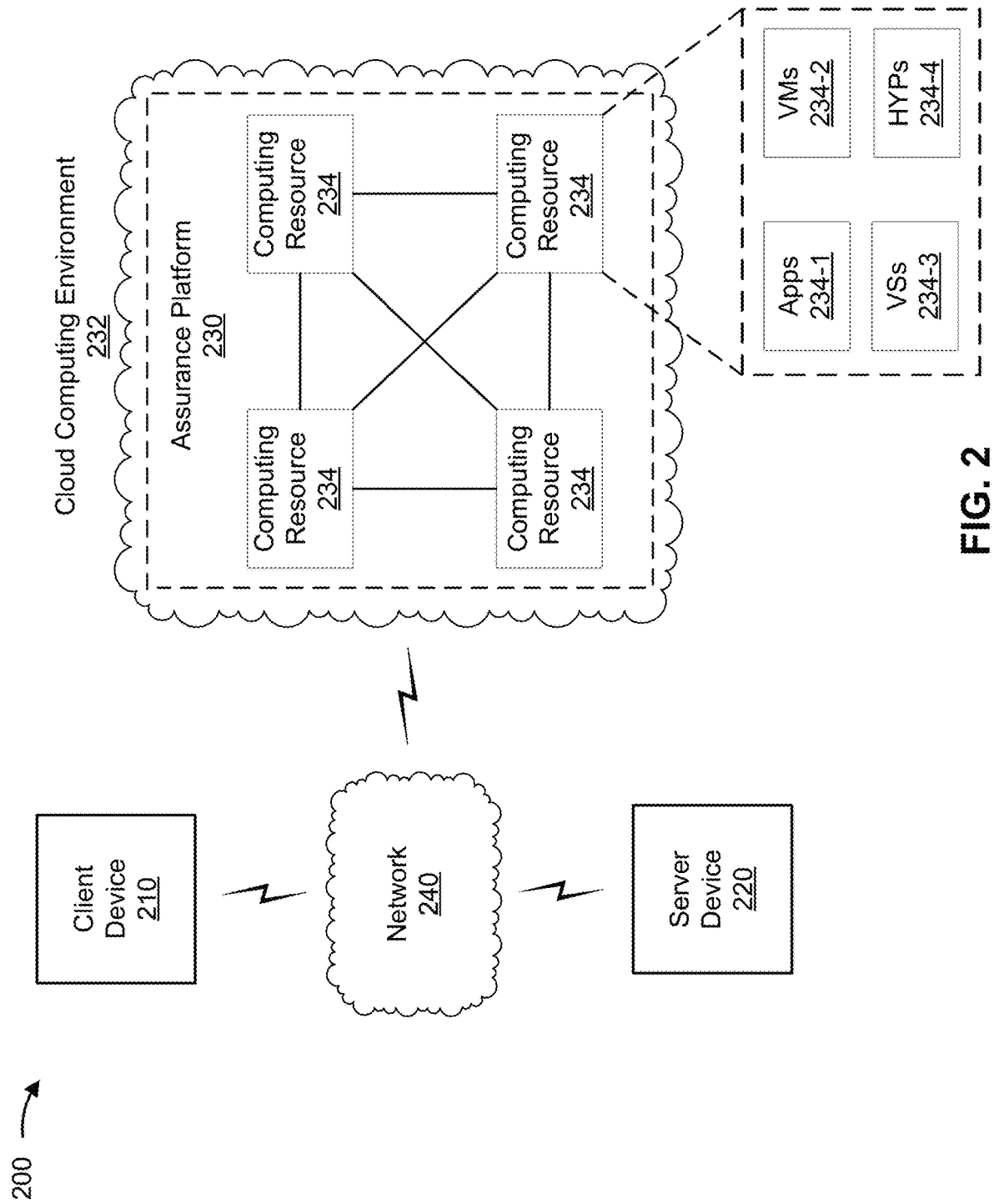
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include client device 210, server device 220, assurance platform 230, cloud computing environment 232, and a set of computing resources 234. Devices of environment 200 may interconnect via wired connections, wireless connections, or a combination of wired and wireless connections.

Client device 210 includes one or more devices capable of receiving, generating, storing, processing, and/or providing information associated with data stored or used by a system. For example, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may provide a set of rules to assurance platform 230 to permit assurance platform 230 to process the data, as described elsewhere herein. Additionally, or alternatively, client device 210 may receive information from assurance platform 230 that identifies an error in the data and/or a source of the error, as described elsewhere herein.

Server device 220 includes one or more devices capable of receiving, generating, storing, processing, and/or providing information associated with data stored or used by a system. For example, server device 220 may include a server (e.g., in a data center or a cloud computing environment), a data center (e.g., a multi-server micro data center), a workstation computer, a virtual machine (VM) provided in a cloud computing environment, or a similar type of device. In some implementations, server device 220 may provide data to assurance platform 230 to permit assurance platform 230 to perform an analysis of the data, as described elsewhere herein. Additionally, or alternatively, server device 220 may perform an action to facilitate fixing an error that assurance platform 230 identifies in the data, as described elsewhere herein.

Assurance platform 230 includes one or more devices capable of receiving, generating, storing, processing, and/or providing information associated with data stored or used by a system. For example, assurance platform 230 may include a cloud server or a group of cloud servers. In some implementations, assurance platform 230 may be designed to be modular such that certain software components can be swapped in or out depending on a particular need. As such, assurance platform 230 may be easily and/or quickly reconfigured for different uses.

In some implementations, as shown, assurance platform 230 may be hosted in cloud computing environment 232. Notably, while implementations described herein describe assurance platform 230 as being hosted in cloud computing environment 232, in some implementations, assurance platform 230 may not be cloud-based (i.e., may be implemented outside of a cloud computing environment) or may be partially cloud-based.

Cloud computing environment 232 includes an environment that hosts assurance platform 230. Cloud computing environment 232 may provide computation, software, data access, storage, and/or other services that do not require end-user knowledge of a physical location and configuration of a system and/or a device that hosts assurance platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host assurance platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with assurance platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
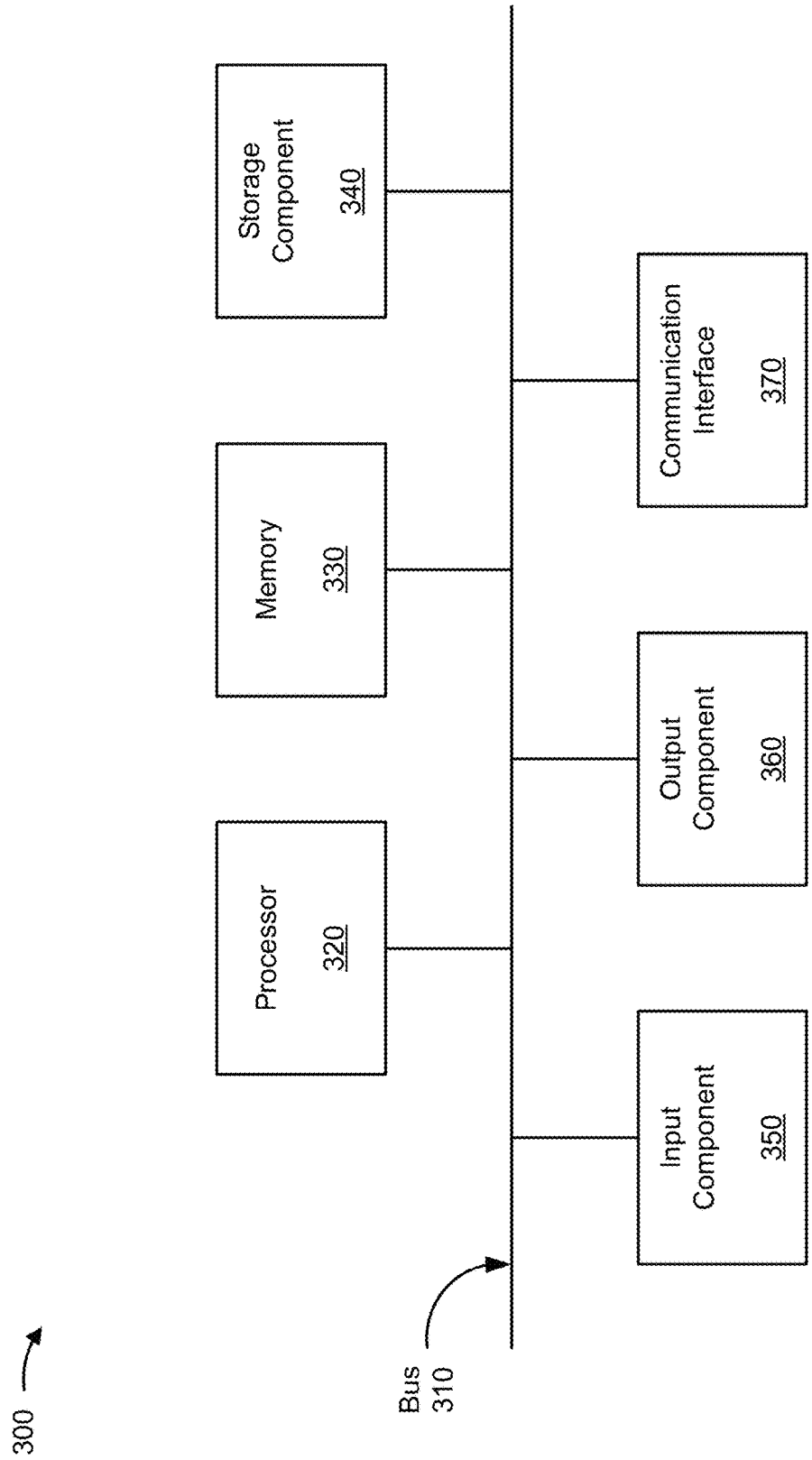
FIG. 3 is a diagram of example components of one or more devices of FIG. 2.

FIG. 3 is a diagram of example components of a device 300. Device 300 may correspond to client device 210, server device 220, assurance platform 230, and/or computing resource 234. In some implementations, client device 210, server device 220, assurance platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
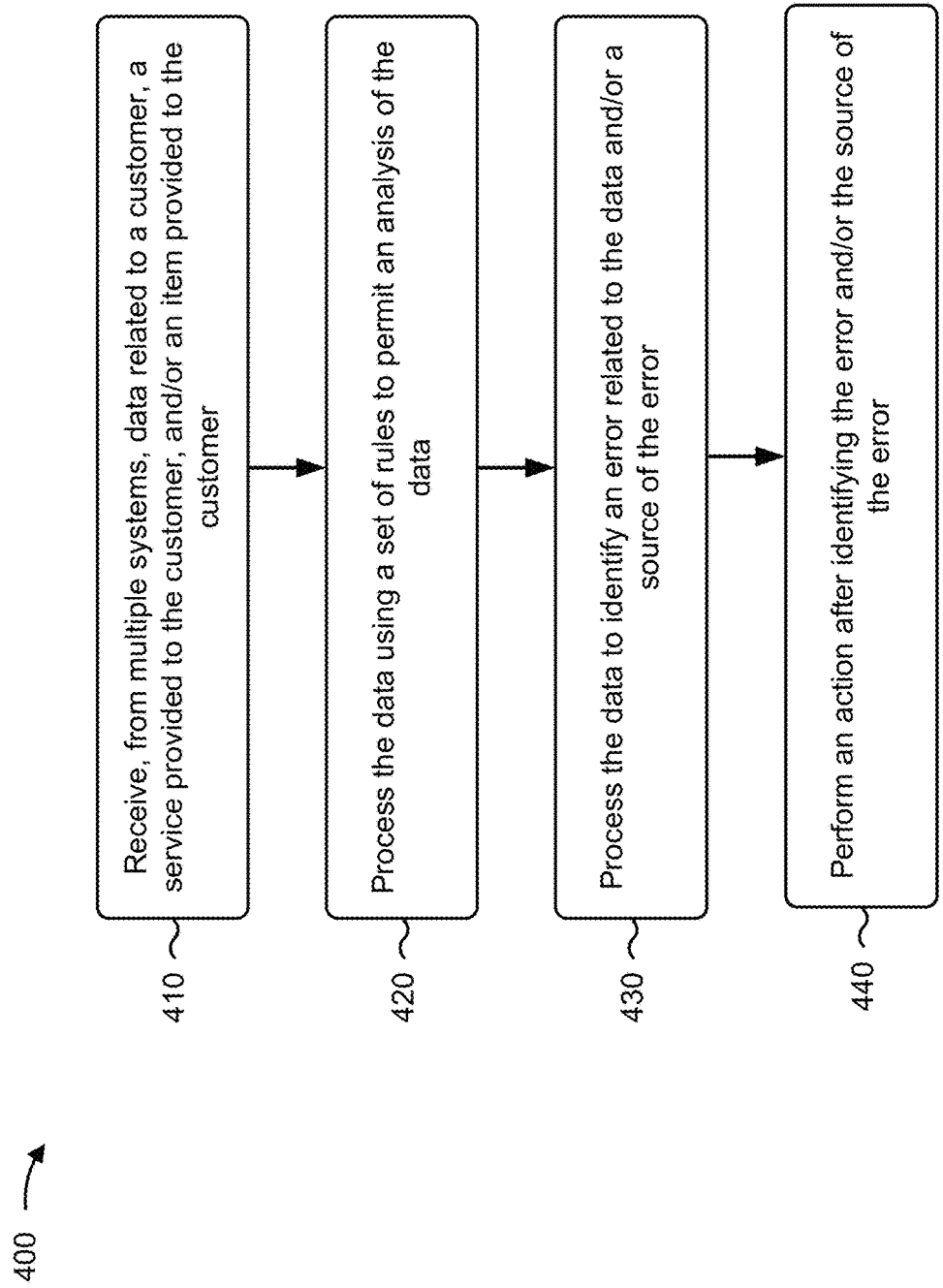
FIG. 4 is a flow chart of an example process for analyzing value-related data to identify an error in the value-related data and/or a source of the error.

FIG. 4 is a flow chart of an example process 400 for analyzing value-related data to identify an error in the value-related data and/or a source of the error. In some implementations, one or more process blocks of FIG. 4 may be performed by assurance platform 230. In some implementations, one or more process blocks of FIG. 4 may be performed by another device or a group of devices separate from or including assurance platform 230, such as client device 210 and/or server device 220.

As shown in FIG. 4, process 400 may include receiving, from multiple systems, data related to a customer, a service provided to the customer, and/or an item provided to the customer (block 410). For example, assurance platform 230 may receive, from multiple systems, data related to a customer, a service provided to the customer, and/or an item provided to the customer. In some implementations, assurance platform 230 may receive the data periodically, based on requesting the data, according to a schedule, and/or the like. In some implementations, assurance platform 230 may receive thousands, millions, billions, etc. of data elements, thereby receiving a data set that cannot be processed manually or objectively (e.g., in a consistent manner) by a human actor.

In some implementations, assurance platform 230 may receive the data from one or more sources (e.g., one or more server devices 220). For example, assurance platform 230 may receive the data from one or more systems associated with an organization. In some implementations, the one or more systems may relate to operations of the organization. For example, the one or more systems may relate to billing operations of an organization, operations that record metrics related to a service and/or an item provided to a customer, operations related to managing an account of a customer, and/or the like.

In some implementations, the data may relate to a customer, a service provided to a customer by an organization, and/or an item provided to a customer (e.g., a good, a product, a material, etc.). In some implementations, the data may identify a service and/or an item provided to a customer. Additionally, or alternatively, the data may identify a usage of a service and/or an item by a customer. For example, the data may identify an amount of a service and/or an item consumed by the customer, an amount of time that the customer used a service and/or an item, a time of day or day of the month that a customer used a service and/or an item, a location to which a service and/or an item was provided, and/or the like.

Additionally, or alternatively, the data may identify a value of a service and/or an item provided to a customer. For example, the data may identify a rate at which the customer is to be billed for usage of a service and/or an item, a total value of usage of a service and/or an item (e.g., based on an amount of usage and a rate at which the customer is to be billed for the usage), a discount or credit to be applied to a value of usage of a service and/or an item, and/or the like. Additionally, or alternatively, the data may identify a value for usage of a service and/or an item that was billed to a customer and/or a value for usage of a service that a customer provided.

In some implementations, the data may permit assurance platform 230 to determine an accuracy of a value associated with an organization, a customer, a service, and/or an item. For example, the data may permit assurance platform 230 to determine an accuracy of a value billed to a customer for a service and/or an item provided to the customer, an accuracy of an amount of usage of a service and/or an item recorded for a customer, and/or the like.

In this way, assurance platform 230 may receive, from multiple systems, data related to a customer, a service, and/or an item, to permit assurance platform 230 to process the data using a set of rules.

As further shown in FIG. 4, process 400 may include processing the data using a set of rules to permit an analysis of the data (block 420). For example, assurance platform 230 may process the data using a set of rules to permit an analysis of the data. In some implementations, assurance platform 230 may process the data after receiving the data (e.g., from one or more server devices 220 associated with one or more systems). In some implementations, assurance platform 230 may process thousands, millions, billions, etc. of data elements when processing the data, thereby processing a data set that cannot be processed manually or objectively by a human actor.

In some implementations, the set of rules may relate to a format of the data, data elements included in the data, deduplication of data elements included in the data, aggregation of data elements of the data, and/or the like. For example, the set of rules may identify a format for the data to permit an analysis of the data, a file type for the data to permit an analysis of the data, particular data elements that need to be included in the data (e.g., based on preferences of an organization, based on processing that a set of systems associated with an organization is to perform on the data, etc.), and/or the like.

In some implementations, assurance platform 230 may receive a set of rules based on input by a user of assurance platform 230 and/or client device 210. Additionally, or alternatively, assurance platform 230 may determine a set of rules. In some implementations, when determining a set of rules, assurance platform 230 may process the data or a training set of data using a technique (e.g., machine learning, artificial intelligence, etc.) to generate a data model related to patterns, trends, etc. of a format of the data, a file type of the data, data elements included in the data, and/or the like and may determine a set of rules based on the pattern, the trend, etc. identified in the data. Additionally, or alternatively, assurance platform 230 may receive a trained data model (e.g., input by a user of assurance platform 230, from server device 220, from another assurance platform 230, etc.) and may use the received data model to process the data to determine a set of rules related to the data.

Continuing, in some implementations, determining a set of rules may include the use of supervised and/or unsupervised machine learning. For example, for unsupervised machine learning, assurance platform 230 may group portions of data into a training data set, a validation data set, and a test data set to permit assurance platform 230 to generate a model related to the data. In some implementations, and prior to training, assurance platform 230 may extract features of the data, collate data from different sources, and/or the like during a preparation stage of machine learning. In this way, assurance platform 230 may use one or more techniques to determine information from complicated and/or imprecise data. In addition, in this way, assurance platform 230 may process noisy or incomplete data, thereby improving processing of data. This permits assurance platform 230 to extract patterns and/or detect trends in data that cannot be extracted or detected by a human. In addition, this permits assurance platform 230 to process data when algorithmic methods of processing the data would consume significant processing resources of assurance platform 230.

In some implementations, assurance platform 230 may process text (e.g., a document, a text file, a web page, etc.) that includes information related to a set of rules for the data to determine a set of rules. For example, assurance platform 230 may use a text processing technique, such as a natural language processing technique, a text analysis technique, an optical character recognition technique, and/or the like, to process text to determine a set of rules.

In some implementations, assurance platform 230 may determine whether particular data elements are included in the data and may obtain additional data if the particular data elements are not included in the data (e.g., by obtaining the data elements from a backup storage location, another device, and/or the like). Additionally, or alternatively, assurance platform 230 may determine whether the data is in a particular format (e.g., includes a particular quantity of characters, a particular quantity of decimal places for numerical data, has particular rows and/or columns for tabular data, etc.) and may format the data according to the particular format if the data is not in the particular format.

Additionally, or alternatively, assurance platform 230 may determine whether the data is in a particular file type (e.g., a text file, a comma-separated values file, a spreadsheet file, etc.) and may convert the data into the particular file type if the data is not in the particular file type. Additionally, or alternatively, assurance platform 230 may deduplicate the data, may aggregate the data (e.g., from different systems), identify corrupted data and obtain replacement data for the corrupted data (e.g., using information related to the data, querying the data from server device 220, cross-referencing the data to identify missing or corrupted data, etc.), and/or the like.

In some implementations, assurance platform 230 may process the data to permit an analysis of the data. For example, assurance platform 230 may process the data to permit assurance platform 230 to perform an analysis of data from multiple systems, to identify an error related to the data, to identify a source of the error, and/or the like. Processing the data in this manner conserves processing resources of assurance platform 230 that would otherwise be consumed analyzing data in different formats, in different file types, that is missing data elements, that includes corrupted data elements, and/or the like. In addition, this increases an efficiency of analyzing data relative to not processing the data prior to analyzing the data, thereby reducing an amount of time needed to perform an analysis of the data.

In this way, assurance platform 230 may process the data using a set of rules to permit assurance platform 230 to process the data to identify an error related to the data and/or a source of the error.

As further shown in FIG. 4, process 400 may include processing the data to identify an error related to the data and/or a source of the error (block 430). For example, assurance platform 230 may process the data to identify an error related to the data and/or a source of the error. In some implementations, assurance platform 230 may process the data to identify an error and/or a source of the error after processing the data using a set of rules. This conserves processing resources of assurance platform 230 when processing the data to identify an error and/or a source of the error by reducing or eliminating errors that would occur from the data not satisfying a set of rules.

In some implementations, assurance platform 230 may process thousands, millions, billions, etc. of data elements. In this way, assurance platform 230 may process a data set that cannot be processed manually or objectively by a human actor.

In some implementations, an error may be related to a value for a data element. For example, a value for a data element may be incorrect, may differ from an expected value, may satisfy a threshold, and/or the like. In some implementations, an error may result from processing of data by a set of systems, input from a user of client device 210 and/or assurance platform 230, and/or the like. For example, a set of systems may cause an error by incorrectly processing data, input from a user of client device 210 and/or assurance platform 230 may include an incorrect value and/or may modify a value for a data element from a correct value to an incorrect value, and/or the like.

In some implementations, an error may reduce a value associated with an organization. For example, an error may cause an incorrect value to be billed to a customer (e.g., for a service and/or an item provided to the customer), an incorrect value to be received from a customer (e.g., for a service and/or an item provided to the customer), an incorrect value to be determined by a system associated with an organization, and/or the like.

In some implementations, assurance platform 230 may process the data to identify inconsistent data (e.g., different values for the same data elements from different systems). Additionally, or alternatively, assurance platform 230 may process the data to identify missing data (e.g., the same data from different systems that does not include the same data elements).

Additionally, or alternatively, assurance platform 230 may process the data to identify a value for a first data element in data from a first system that differs from a value for a second data element from a second system (e.g., by a threshold amount). For example, the first data element and the second data element may be the same data element in data from different systems, the value for the first data element may be an expected value (e.g., as determined by assurance platform 230 to verify the value for the second data element) and the value for the second data element may be an actual value (e.g., as determined by a system associated with an organization), and/or the like. Additionally, or alternatively, assurance platform 230 may process the data to determine whether a value for a first data element satisfies a value for a second data element, satisfies a threshold, and/or the like.

In some implementations, assurance platform 230 may process the data to identify a pattern related to errors in the data. For example, assurance platform 230 may identify a pattern of errors (e.g., type of error, such as missing data elements, incorrect values for data elements, etc.) from a particular set of systems, associated with a particular set of customers, associated with a particular set of services or items, associated with output from a particular set of processes implemented by a set of systems, and/or the like. Additionally, or alternatively, assurance platform 230 may process the data to identify a trend related to errors in the data. For example, assurance platform 230 may process the data to determine whether errors in the data are increasing or decreasing in quantity over time, whether the same types of errors are being identified multiple times in the data over time, and/or the like.

In some implementations, and as a specific example, assurance platform 230 may determine an error related to usage of a service by a customer (e.g., where different systems have recorded different usage amounts for a customer). Additionally, or alternatively, and as another specific example, assurance platform 230 may determine an error related to a value determined for usage of a service (e.g., where a value determined by a system does not match a value determined by another system, where a value determined by a system does not match a value that assurance platform 230 determines, etc.). Additionally, or alternatively, and as another specific example, assurance platform 230 may determine an error related to a value billed to a customer for usage of a service and/or a value provided by a customer for usage of a service (e.g., where a bill provided to a customer identified an incorrect value for a service and/or an item provided to the customer, where the customer provided an incorrect value for a service and/or an item provided to the customer, etc.).

In some implementations, assurance platform 230 may process data to analyze various risk areas (e.g., combinations of services and/or items, and systems associated with operations of an organization that provide the services and/or items). For example, and in a telecommunications context, assurance platform 230 may perform an analysis of data to reconcile data in a network system and a billing system (e.g., for a voice service line), such as by determining whether a value billed to a customer by a billing system matches an amount of a service provided to the customer as recorded by the network system.

Additionally, or alternatively, and in a telecommunications context, assurance platform 230 may perform an analysis of data to reconcile data in a mediation system and a billing system for a voice service line, for example. Additionally, or alternatively, and in a telecommunications context, assurance platform 230 may perform an analysis of data to reconcile data in a mediation system and a billing system for a short message service (SMS) service line, for example. Additionally, or alternatively, and in a telecommunications context, assurance platform 230 may perform an analysis to reconcile data in a customer relationship management (CRM) system and a billing system, for example. Additionally, or alternatively, and in a telecommunications context, assurance platform 230 may perform an analysis to reconcile data in a mediation system and a billing system for a data service line, for example.

In some implementations, assurance platform 230 may identify a source of an error. For example, assurance platform 230 may identify a particular system as a source of an error (e.g., by comparing values for the same data element from different systems, by determining an expected value for a data element and comparing the expected value to a value stored by a system, etc.). Additionally, or alternatively, and as another example, assurance platform 230 may identify manual manipulation of the data by a user of client device 210 as a source of the error (e.g., by determining that a log indicates that a value for a data element was modified from a correct value to an incorrect value). Additionally, or alternatively, and as another example, assurance platform 230 may identify a particular process or transaction implemented by a set of systems as a source of an error (e.g., by determining that a particular process or transaction produces a threshold quantity of errors, the same error across different systems, etc.).

In some implementations, assurance platform 230 may process the data using a technique to identify an error and/or a source of an error. For example, assurance platform 230 may process the data using machine learning, artificial intelligence, and/or the like. In some implementations, assurance platform 230 may be trained on a training data set that identifies errors and/or sources of errors to permit assurance platform 230 to identify an error in the data and/or a source of the error. Conversely, in some implementations, assurance platform 230 may receive a trained model from client device 210 and/or another assurance platform 230 to permit assurance platform 230 to identify an error in the data and/or a source of the error.

In this way, assurance platform 230 may use machine learning, artificial intelligence, and/or the like to process data, such as to identify a value for an organization that is reduced as a result of an error related to the data and/or to identify a source of the error. Additionally, or alternatively, assurance platform 230 may use artificial intelligence, machine learning, and/or the like to perform predictive analytics on data (e.g., to identify a future source of a future error related to data, a manner in which a source of an error might cause other errors in data, etc.). This facilitates preemptive fixing of errors before the errors disrupt operations of systems of an organization, thereby improving operations of the systems and/or conserve computing resources of the systems that would otherwise be consumed processing error-containing data.

In some implementations, assurance platform 230 may process data using a big data tool. For example, assurance platform 230 may process the data using a set of big data tools that includes Hadoop, Hive, Athena, HBase, and/or the like. In some implementations, assurance platform 230 may use a big data tool to process thousands, millions, billions, or more data elements.

In this way, assurance platform 230 may process the data to identify an error related to the data and/or a source of the error prior to performing an action.

As further shown in FIG. 4, process 400 may include performing an action after identifying the error and/or the source of the error (block 440). For example, assurance platform 230 may perform an action after identifying the error and/or the source of the error.

In some implementations, an action may positively impact an error. For example, an action may fix an error, facilitate fixing an error, reduce an impact of an error (e.g., reduce another error that results from an error), and/or the like. Additionally, or alternatively, an action may positively impact operations of an organization. For example, an action may cause an organization to operate in a particular manner that reduces or eliminates an error or an impact of an error.

Additionally, or alternatively, an action may positively impact a value associated with an organization and/or operations of an organization. For example, an action may increase a value associated with operations of an organization, may reduce a loss of a value associated with operations of an organization, may cause a value included in data from a system to be reconciled with a value included in other data from another system, and/or the like. Continuing with the previous example, an action may positively impact a value via recovery of a value for a service and/or an item for which the organization failed to bill the customer, by reducing or eliminating a process associated with an organization from resulting in a value that includes an error, by improving an accuracy of a value determined by a system, and/or the like.

In some implementations, assurance platform 230 may perform an action to facilitate fixing the error. In some implementations, assurance platform 230 may update the data. Additionally, or alternatively, assurance platform 230 may remove a particular data element from the data. Additionally, or alternatively, assurance platform 230 may generate an issue ticket to have an administrator fix the data. In some implementations, assurance platform 230 may receive data from a set of systems after performing an action to facilitate fixing an error. For example, assurance platform 230 may reprocess the data in a manner similar to that described with respect to block 420 and/or block 430 to determine whether the action fixed the error.

In some implementations, assurance platform 230 may provide a result of processing the data for display (e.g., via a dashboard provided for display by client device 210). For example, assurance platform 230 may provide a visualization of the data that was processed, a result of processing the data, and/or the like. Continuing with the previous example, the dashboard may permit the user to modify the visualization of the data, such as by permitting adjustment of a time period for which data is displayed via the dashboard, adjustment of types of data displayed via the dashboard, and/or the like.

In some implementations, assurance platform 230 may generate a bill for a value for which an organization failed to bill a customer (e.g., for a service and/or an item that the organization provided to the customer). Additionally, or alternatively, assurance platform 230 may generate a report that includes information identifying an error, a source of an error, a value to be recovered from a customer, and/or the like.

In some implementations, assurance platform 230 may send a message (e.g., to client device 210) that identifies the error, the source of the error, whether the error was fixed, and/or the like. In some implementations, assurance platform 230 may schedule a meeting. For example, assurance platform 230 may use electronic calendars associated with managers and/or employees of an organization and may identify an available time for the meeting. In some implementations, assurance platform 230 may trigger an alarm. For example, assurance platform 230 may monitor data from the systems and may trigger an alarm when assurance platform 230 identifies an error in the data.

In some implementations, assurance platform 230 may take a system offline and/or bring a system online (e.g., by sending a set of instructions to the system). Additionally, or alternatively, assurance platform 230 may reboot a system (e.g., by sending a set of instructions to the system). Additionally, or alternatively, assurance platform 230 may switch a role of a system (e.g., from master system to slave system or from slave system to master system). Additionally, or alternatively, assurance platform 230 may update a model (e.g., a set of rules used to process data). Additionally, or alternatively, assurance platform 230 may generate a coupon, a rebate, or another offer and may provide information identifying the coupon, the rebate, or the other offer to client device 210 associated with a customer.

In this way, assurance platform 230 may perform an action after identifying the error and/or the source of the error.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
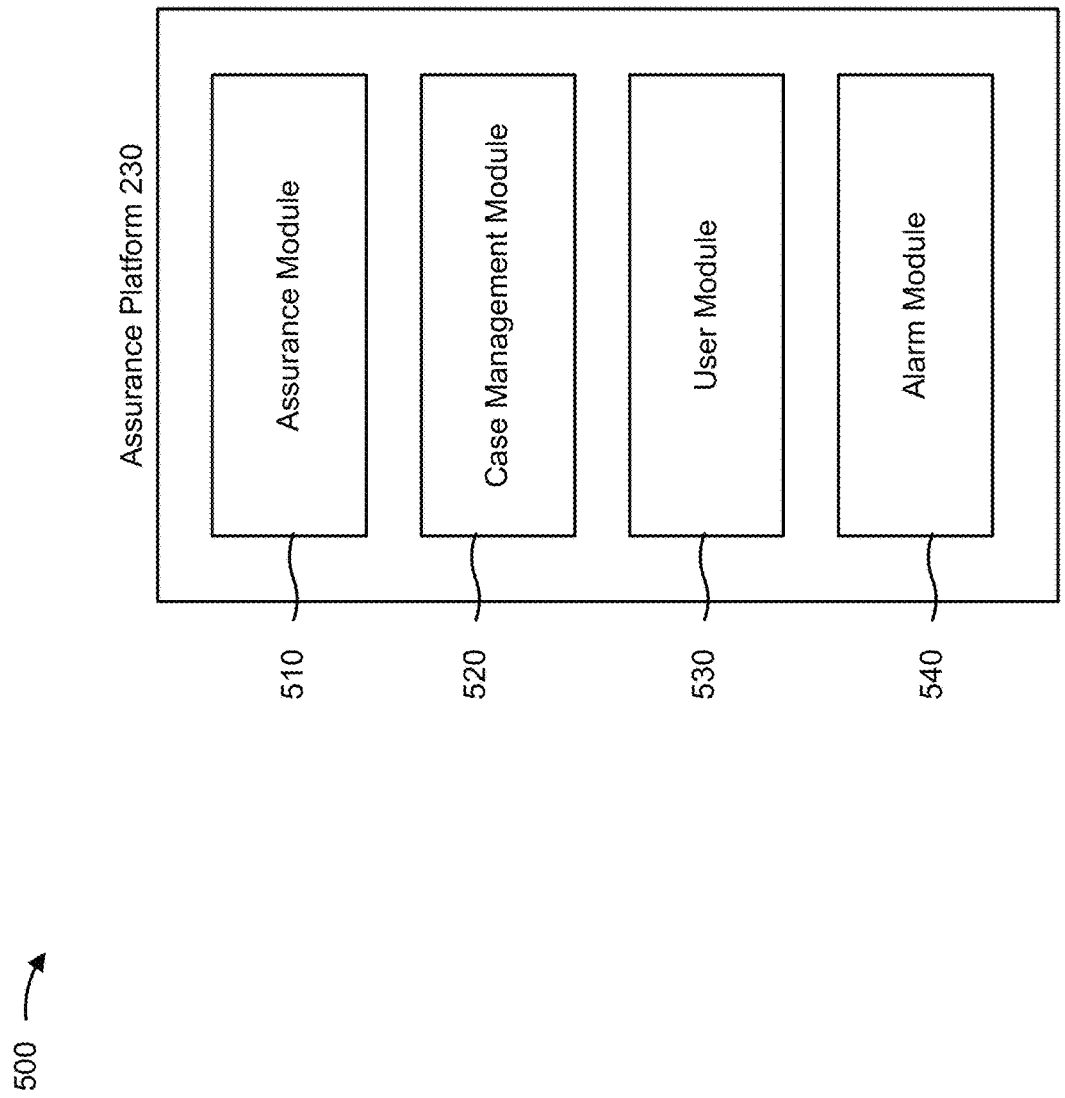
FIG. 5 is a diagram of an example implementation relating to the example process shown in FIG. 4.

FIG. 5 is a diagram of an example implementation 500 relating to example process 400 shown in FIG. 4. FIG. 5 shows an example of a system architecture of assurance platform 230. As shown in FIG. 5, assurance platform 230 may include a variety of modules, such as assurance module 510, case management module 520, user module 530, and alarm module 540.

In some implementations, assurance module 510 may process data in a manner similar to that described above with respect to block 420 and/or block 430. For example, assurance module 510 may process data using a set of rules to permit an analysis of the data. Additionally, or alternatively, assurance module 510 may process the data to identify an error related to the data and/or a source of the error.

In some implementations, case management module 520 may store information that identifies errors identified in the data. Additionally, or alternatively, case management module 520 may store information identifying a source of an error. In some implementations, case management module 520 may permit a user of client device 210 and/or assurance platform 230 to manage identified errors. For example, case management module 520 may provide information for display that identifies a status of identified errors (e.g., whether the errors are in progress for being fixed), may permit a user of client device 210 and/or assurance platform 230 to manually add a record for an error, delete a record for an error, modify a record for an error (e.g., modify a status of an error), and/or the like. Additionally, or alternatively, case management module 520 may perform an action to facilitate fixing an error identified in data.

In some implementations, user module 530 may manage an account associated with assurance platform 230 (e.g., a user account, an administrator account, etc.). For example, user module 530 may permit management of access to data, assurance platform 230, and/or the like (e.g., permissions related to accessing data). In some implementations, user module 530 may store information identifying an account associated with assurance platform 230. Additionally, or alternatively, assurance platform 230 may store information identifying permission of the account associated with assurance platform 230. In some implementations, user module 530 may permit modification of an account associated with assurance platform 230 (e.g., creation of a new account, deletion of an account, etc.), modification of a permission of an account (e.g., granting of a permission to an account, revocation of a permission of an account, etc.), and/or the like.

In some implementations, alarm module 540 may perform an action related to notifying a user of client device 210 and/or assurance platform 230 of an error related to data. For example, alarm module 540 may send a message to client device 210, may schedule a meeting, and/or the like when assurance platform 230 identifies an error. In some implementations, alarm module 540 may monitor a result of processing data associated with various systems (e.g., in real-time or near real-time) and may perform an action based on determining that a result indicates an error in the data and/or a source of the error. This conserves computing resources that would otherwise be consumed using error-containing data by reducing an amount of time that error-containing data is available for use by various systems.

As indicated above, FIG. 5 is provided merely as an example. Other examples are possible and may differ from what was described with regard to FIG. 5.

FIG. 6 is a diagram of an example implementation 600 relating to example process 400 shown in FIG. 4. FIG. 6 shows an example of a system architecture associated with assurance platform 230. As shown in FIG. 6, implementation 600 may include various layers and/or frameworks, such as user interface (UI) layer 610, application programming interface (API) framework (620), reconciliation framework 630, data load framework 640, and data source layer 650.

In some implementations, UI layer 610 may be associated with providing information for display via a display associated with assurance platform 230. For example, UI layer 610 may provide data and/or a result of processing data for display. In some implementations, UI layer 610 may provide data and/or information identifying a result via a user interface associated with assurance platform 230 and/or client device 210. For example, UI layer 610 may provide data organized into charts, graphs, tables, and/or the like.

In some implementations, API framework 620 may be associated with facilitating an exchange of data among various elements and/or components of assurance platform 230. For example, API framework 620 may connect assurance platform 230 and a data source and/or a storage location for processed data (e.g., server device 220). In addition, API framework 620 may connect UI layer 610 and assurance platform 230 (e.g., to permit assurance platform 230 to provide data for display). In some implementations, API framework 620 may include a RESTful web service, a database connector, a JavaScript Object Notation (JSON) request/response protocol, a query builder, and/or the like.

In some implementations, reconciliation framework 630 may be associated with processing data. For example, reconciliation framework 630 may process data to identify an error in data and/or a source of the error. In some implementations, reconciliation framework 630 may include a Hive query, Phoenix views, a rule query, and/or the like. In some implementations, reconciliation framework 630 may perform an action similar to that described with respect to block 430.

In some implementations, data load framework 640 may be associated with receiving data. For example, data load framework 640 may permit assurance platform 230 to receive data from various systems and to load the data into assurance platform 230. In some implementations, data load framework 640 may perform an action similar to that described with respect to block 410 and/or block 420. In some implementations, data load framework 640 may include a Java data push/pull adaptor. In some implementations, data load framework 640 may determine information related to data from a data source. For example, data load framework 640 may determine information that identifies a source of the data, information that identifies a destination of the data, information that identifies a manner in which the data has been manipulated, and/or the like.

In some implementations, data source layer 650 may include various data sources from which assurance platform 230 is to receive data. In some implementations, data source layer 650 may include various systems, various types of files, and/or the like. In some implementations, data source layer 650 may provide data to assurance platform 230 (e.g., via use of Java database connectivity (JDBC)).

As indicated above, FIG. 6 is provided merely as an example. Other examples are possible and may differ from what was described with regard to FIG. 6.

In this way, assurance platform 230 may analyze data to facilitate identification of an error in data and/or a source of an error. This permits identification and/or collection of lost value related to operations of an organization, minimizes interruption to operations of the organization, and/or the like. In addition, this improves operations of the organization by improving data that a system associated with the organization use to implement operations of the organization. Further, this conserves processing resources of a system associated with the organization by improving data that the system processes and/or uses.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    one or more processors to:

19 receive, from multiple systems, data,
  the data being related to at least one of:
    a usage of a service provided to a customer including information identifying an amount of time the customer used the service and a billing rate for the customer, or
    a usage of an item to be provided to the customer including information identifying an amount of time associated with the customer consuming the item and a billing rate for the customer,
  the multiple systems being related to operations of an organization,
  the data including a first portion of the data in a first format and a second portion of the data in a second format,
    the first portion of the data being received from a first system of the multiple systems, and
    the second portion of the data being received from a second system of the multiple systems, and
    at least two of the multiple systems being capable of communicating with each other;
process the data using a machine learning model trained to determine a set of rules to apply to the data;
process the data, using the set of rules, to perform at least one of:
  reformatting the first portion of the data and the second portion of the data to a third format,
  performing a data deduplication process on the data, or
  performing a data aggregation process on the data;
identify errors in the data based on processing the data using the set of rules,
  wherein the one or more processors when identifying the error are to:
    identify that a first value from the first system and a second value from the second system differ by a threshold;
determine, after identifying the errors, a pattern or trend in the errors;
identify a particular process or transaction implemented by the first system or the second system as a source of the pattern or the trend;
perform an action, after identifying the source of the pattern or the trend, to facilitate fixing the pattern or the trend,
  wherein the one or more processors, when performing the action, are to:
    update the machine learning model to update the set of rules used to process the data, and
    switch a role of a system, from the multiple systems, from a master system role to a slave system role or from a slave system role to a master system role; and
reprocess the data, after updating the machine learning model or switching the role of the system, to determine whether the action fixed the error based on the first value and the second value differing by less than the threshold.

2. The device of claim 1, where the one or more processors are further to:
receive information identifying the set of rules based on input from a user of the device; and
where the one or more processors, when processing the data to determine the set of rules, are further to:
  determine the set of rules further based on the input.

20

3. The device of claim 1, where the one or more processors, when processing the data to identify the errors in the data, are to:
  determine that a value related to the operations satisfies another threshold; and
  identify an error, of the errors, based on a result of determining that the value related to the operations satisfies the other threshold.

4. The device of claim 1, where the one or more processors, when processing the data to identify the errors in the data, are to:
  determine that the data is stored inconsistently across the multiple systems; and
  identify the errors in the data based on a result of determining that the data is stored inconsistently across the multiple systems.

5. The device of claim 1, where the one or more processors, when performing the action, are to:
  trigger an alarm based on a result of processing the data to identify the errors in the data.

6. The device of claim 1, where the one or more processors are further to:
  determine whether particular data elements are included in the data based on a result of processing the data using the set of rules; and
  obtain additional data after determining that the particular data elements are not included in the data.

7. A method, comprising:
receiving, by a device and from multiple systems, data,
  the data being related to at least one of:
    a usage of a service provided to a customer including information identifying an amount of time the customer used the service and a billing rate for the customer, or
    a usage of an item to be provided to the customer including information identifying an amount of time associated with the customer consuming the item and a billing rate for the customer,
  the multiple systems being related to operations of an organization,
  the data including a first portion of the data in a first format and a second portion of the data in a second format,
    the first portion of the data being received from a first system of the multiple systems, and
    the second portion of the data being received from a second system of the multiple systems, and
    at least two of the multiple systems being capable of communicating with each other;
processing, by the device, the data using a machine learning model trained to determine a set of rules to apply to the data;
processing, by the device and using the set of rules, the data to perform at least one of:
  reformatting the first portion of the data and the second portion of the data to a third format,
  performing a data deduplication process on the data, or
  performing a data aggregation process on the data;
identifying, by the device and based on processing the data using the set of rules, errors in the data,
  wherein identifying the error comprises:
    identifying that a first value from the first system and a second value from the second system differ by a threshold; determining, by the device and after identifying the errors, a pattern or trend in the errors;
identifying, by the device, a particular process or transaction implemented by the first system or the second system as a source of the pattern or the trend;

performing, by the device, an action, after identifying the source of the pattern or the trend, to facilitate fixing the pattern or the trend,
wherein performing the action comprises:
updating the machine learning model to update the set of rules used to process the data, and
switching a role of a system, from the multiple systems, from a master system role to a slave system role or from a slave system role to a master system role; and
reprocessing, by the device, the data, after updating the machine learning model or switching the role of the system, to determine whether the action fixed the error based on the first value and the second value differing by less than the threshold.

8. The method of claim 7, further comprising:
receiving information identifying the set of rules based on input from a user of the device; and
wherein processing the data to determine the set of rules further comprises:
determining the set of rules further based on the input.

9. The method of claim 7, wherein processing the data to identify the errors in the data comprises:
determining that a value related to the operations satisfies another threshold; and
identifying an error, of the errors, based on a result of determining that the value related to the operations satisfies the other threshold.

10. The method of claim 7, wherein processing the data to identify the errors in the data comprises:
determining that the data is stored inconsistently across the multiple systems; and
identifying the errors in the data based on a result of determining that the data is stored inconsistently across the multiple systems.

11. The method of claim 7, wherein performing the action comprises:
triggering an alarm based on a result of processing the data to identify the errors in the data.

12. The method of claim 7, further comprising:
determining whether particular data elements are included in the data based on a result of processing the data using the set of rules; and
obtaining additional data after determining that the particular data elements are not included in the data.

13. The method of claim 7, wherein performing the action comprises:
updating the data to facilitate fixing the data.

14. A non-transitory computer-readable medium storing instructions, the instructions comprising:
one or more instructions that, when executed by one or more processors, cause the one or more processors to:
receive, from multiple systems, data,
the data being related to at least one of:
a usage of a service provided to a customer including information identifying an amount of time the customer used the service and a billing rate for the customer, or
a usage of an item to be provided to the customer including information identifying an amount of time associated with the customer consuming the item and a billing rate for the customer,
the multiple systems being related to operations of an organization,
the data including a first portion of the data in a first format and a second portion of the data in a second format,
the first portion of the data being received from a first system of the multiple systems, and
the second portion of the data being received from a second system of the multiple systems, and
at least two of the multiple systems being capable of communicating with each other;
process the data using a machine learning model trained to determine a set of rules to apply to the data;
process, using the set of rules, the data to perform at least one of:
reformatting the first portion of the data and the second portion of the data to a third format,
performing a data deduplication process on the data, or
performing a data aggregation process on the data;
identify, based on processing the data using the set of rules, errors in the data,
wherein the one or more instructions, that further cause the one or more processors to identify the error, further cause the one or more processors to:
identify that a first value from the first system and a second value from the second system differ by a threshold;
determine, after identifying the errors, a pattern or trend in the errors;
identify a particular process or transaction implemented by the first system or the second system as a source of the pattern or the trend;
perform an action, after identifying the source of the pattern or the trend, to facilitate fixing the pattern or the trend,
wherein the one or more instructions, that cause the one or more processors to perform the action, further cause the one or more processors to:
update the machine learning model to update the set of rules used to process the data, and
switch a role of a system, from the multiple systems, from a master system role to a slave system role or from a slave system role to a master system role; and
reprocess the data, after updating the machine learning model or switching the role of the system, to determine whether the action fixed the error based on the first value and the second value differing by less than the threshold.

15. The non-transitory computer-readable medium of claim 14, wherein the one or more instructions further cause the one or more processors to:
receive information identifying the set of rules based on input from a user; and
wherein the one or more instructions, that cause the one or more processors to process the data to determine the set of rules, further cause the one or more processors to:
determine the set of rules further based on the input.

16. The non-transitory computer-readable medium of claim 14, wherein the one or more instructions, that cause the one or more processors to process the data to identify the errors in the data, cause the one or more processors to:
determine that a value related to the operations satisfies another threshold; and
identify an error, of the errors, based on a result of determining that the value related to the operations satisfies the other threshold.

17. The non-transitory computer-readable medium of claim 14, wherein the one or more instructions, that cause the one or more processors to process the data to identify the errors in the data, cause the one or more processors to:
determine that the data is stored inconsistently across the multiple systems; and identify the errors in the data based on a result of determining that the data is stored inconsistently across the multiple systems.

18. The non-transitory computer-readable medium of claim 14, wherein the one or more instructions, that cause the one or more processors to perform the action, cause the one or more processors to:
trigger an alarm based on a result of processing the data to identify the errors in the data.

19. The non-transitory computer-readable medium of claim 14, wherein the one or more instructions further cause the one or more processors to:
determine whether particular data elements are included in the data based on a result of processing the data using the set of rules; and
obtain additional data after determining that the particular data elements are not included in the data.

20. The non-transitory computer-readable medium of claim 14, wherein the one or more instructions, that cause the one or more processors to perform the action, cause the one or more processors to:
update the data to facilitate fixing the data.

* * * * *